United States Patent
Bloomberg et al.

(10) Patent No.: US 7,489,830 B2
(45) Date of Patent: Feb. 10, 2009

(54) METHODS FOR GENERATING ANTI-ALIASED TEXT AND LINE GRAPHICS IN COMPRESSED DOCUMENT IMAGES

(75) Inventors: Dan S. Bloomberg, Palo Alto, CA (US); Luc Vincent, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 100 days.

(21) Appl. No.: 11/878,082

(22) Filed: Jul. 20, 2007

(65) Prior Publication Data
US 2008/0024843 A1 Jan. 31, 2008

Related U.S. Application Data

(60) Division of application No. 11/354,044, filed on Feb. 15, 2006, now Pat. No. 7,266,250, which is a continuation of application No. 09/487,583, filed on Jan. 19, 2000, now abandoned.

(51) Int. Cl.
G06K 9/40 (2006.01)
G06K 9/36 (2006.01)

(52) U.S. Cl. ................ 382/269; 382/232

(58) Field of Classification Search ......... 382/266–269, 382/274–275, 173–177, 232–253, 205, 298–299; 358/3.01, 3.02, 3.26, 1.9, 1.2, 447, 445, 505, 358/462; 345/611–615, 441–443, 467–470
See application file for complete search history.

(56) References Cited

U.S. PATENT DOCUMENTS

| | | | |
|---|---|---|---|
| 4,704,605 A | 11/1987 | Edelson | |
| 5,519,823 A | 5/1996 | Barkans | |
| 5,778,092 A | 7/1998 | MacLeod et al. | |
| 5,790,269 A | 8/1998 | Masaki et al. | |
| 5,999,659 A * | 12/1999 | McCarthy et al. | 382/269 |
| 6,377,273 B1 | 4/2002 | Lee et al. | |
| 6,421,060 B1 | 7/2002 | Luken | |
| 6,486,888 B1 | 11/2002 | Fushiki et al. | |
| 6,757,449 B1 * | 6/2004 | Loce | 382/299 |

FOREIGN PATENT DOCUMENTS

| | | |
|---|---|---|
| EP | 0 516 477 A2 | 12/1992 |
| EP | 0 590 923 A2 | 4/1994 |
| EP | 0 886 242 A1 | 12/1998 |
| EP | 0 946 048 A2 | 9/1999 |
| GB | 2247596 A | 3/1992 |

* cited by examiner

*Primary Examiner*—Sherali Ishrat
(74) *Attorney, Agent, or Firm*—Oliff & Berridge, PLC

(57) ABSTRACT

A method and system for storing and generating anti-aliased text and lineart data from compressed document image files, using a MRC model that represents the image as an ordered set of mask/image pairs at resolutions appropriate to the content of each layer. The method and system provide the ability to generate for anti-aliased text data to improve appearance at both high and low resolution, and to avoid baseline jitter of compressed tokens.

8 Claims, 17 Drawing Sheets

Complexity
FIG. 1
Complexity
FIG. 2
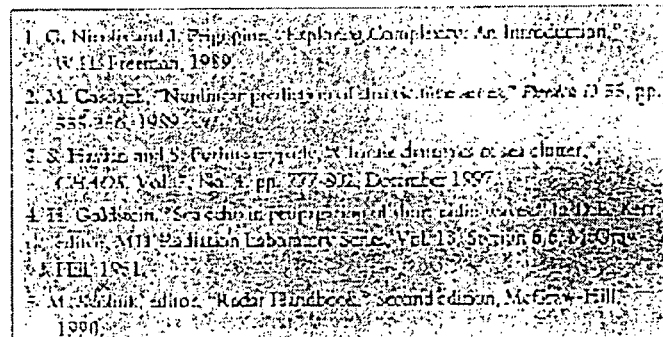
FIG. 3
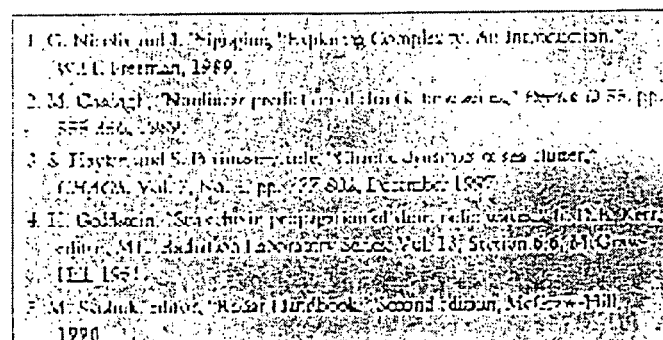
FIG. 4

FIG. 7  Complexity

FIG. 8  Complexity

FIG. 9  Complexity

FIG. 10  Comple ity

FIG. 11  Complexity

FIG. 12  Complexity

Complexity

*FIG. 26*

1. G. Nicolis and I. Prigogine, "Exploring Complexity: An Introduction," W.H. Freeman, 1989.
2. M. Casdagli, "Nonlinear prediction of chaotic time series," Physica D 35, pp. 335-356, 1989.
3. S. Haykin and S. Puthusserypady, "Chaotic dynamics of sea clutter," CHAOS, Vol. 7, No. 4, pp. 777-802, December 1997.
4. H. Goldstein, "Sea echo in propagation of short radio waves," D.E. Kerr, editor, MIT Radiation Laboratory Series, Vol. 13, Section 6.6, McGraw-Hill, 1951.
5. M. Skolnik, editor, "Radar Handbook," Second edition, McGraw-Hill, 1990.

*FIG. 27*

Complexity

FIG. 29

1. G. Nicolis and I. Prigogine, "Exploring Complexity: An Introduction," W.H. Freeman, 1989.
2. M. Casdagli, "Nonlinear prediction of chaotic time series," Physica D 35, pp. 335-356, 1989.
3. S. Haykin and S. Puthusserypady, "Chaotic dynamics of sea clutter," CHAOS, Vol. 7, No. 4, pp. 777-802, December 1997.
4. H. Goldstein, "Sea echo in propagation of short radio waves," D.E. Kerr, editor, MIT Radiation Laboratory Series, Vol. 13, Section 6.6, p. 481, McGraw-Hill, 1951.
5. M. Skolnik, editor, "Radar Handbook," Second edition, McGraw-Hill, 1990.

FIG. 30

Complexity

FIG. 32

1. G. Nicolis and I. Prigogine, "Exploring Complexity: An Introduction," W.H. Freeman, 1989.
2. M. Casdagli, "Nonlinear prediction of chaotic time series," Physica D 35, pp. 335-356, 1989.
3. S. Haykin and S. Puthusserypady, "Chaotic dynamics of sea clutter," CHAOS, Vol. 7, No. 6, pp. 777-802, December 1997.
4. H. Goldstein, "Sea echo in propagation of short radio waves," in D.E. Kerr, editor, MIT Radiation Laboratory Series, Vol. 13, Section 6.6, McGraw-Hill, 1951.
5. M. Skolnik, editor, "Radar Handbook," Second edition, McGraw-Hill, 1990.

FIG. 33

METHODS FOR GENERATING ANTI-ALIASED TEXT AND LINE GRAPHICS IN COMPRESSED DOCUMENT IMAGES

This is a Division of application Ser. No. 11/354,044 filed Feb. 15, 2006, now U.S. Pat. No. 7,266,250 which in turn is a Continuation of application Ser. No. 09/487,583, filed Jan. 19, 2000, now abandoned. The entire disclosure of the prior applications is hereby incorporated by reference herein in its entirety.

BACKGROUND

A method and system stores and generates anti-aliased text or lineart from compressed document image files. More specifically, a Mixed Raster Content (MRC) model represents the image as an ordered set or mask/image pairs at resolutions appropriate to the content of each layer. When using token compression, use of anti-aliased text or lineart improves text and lineart image appearance for both low and high resolution by smoothing edges and avoiding token baseline jitter.

Uncompressed grayscale or color scanned document images contain too much data for convenient on-line storage and retrieval. Lossless compression of a 300 ppi grayscale scanned image, using universal compression such as Lempel-Ziv, typically causes only a small reduction in stored data. Thus, for example, an 8 MB uncompressed image may be minimally shrunk to 4 to 7 MB after lossless compression. Compression is only minimal because most of the image data is produced as a result of scanner noise in the 3 or 4 least significant bits. Thus, some lossy compression is necessary. However, due to conflicting application requirements, there is no universal method that will fit all situations.

For example, suppose the requirement is that compression must be visually lossless. The amount of achievable compression is limited, and depends strongly on the scanning resolution. For example, at 300 ppi, simple hierarchical vector quantization (HVQ) provides a guaranteed 4× compression, with perhaps a 7× typical compression after further Lempel-Ziv coding. However, even at 8× compression, grayscale images are produced that compress to about 1.0 MB/page, which is too much for many applications.

To get a reasonable (but not lossless) image, at significantly better compression, a MRC approach may be used, in which the image is stored as ordered pairs of (mask, image) layers. Mixed Raster Content (MRC) is one approach to satisfy the compression needs of differing types of data. MRC involves separating a composite image into a plurality of masks, and separately applying an appropriate compression technique to each image mask. The document is represented by a pixel map that is decomposed into a multiple mask representation.

The masks allow the image to be painted through, and the ordering is necessary because the last pixel painted in each location is the one that is apparent to a viewer. In the most simple but non-trivial example, two (mask, image) pairs are used. The first layer is the background image, represented as a low-resolution gray or color image, and its mask is taken to cover the entire image. The second layer is the text/lineart layer, represented by a binary high-resolution, e.g., a 300 ppi or greater mask and a very low resolution foreground color image that is painted through the high resolution mask. The foreground color image can be at even lower resolution than 100 ppi.

It is possible to conform with the MRC format, and use a 300 ppi text or lineart mask, compressed lossily using connected component tokens, and a 100 ppi background image compressed with JPEG or wavelets. It is also possible to use a third (mask, image) layer pair for higher resolution embedded color images that are located by a segmentor. This third image layer may also be compressed using JPEG or wavelets. A similar approach has also been used where text or lineart is also compressed lossily using binary image tokens and wavelet compression is used on the background image.

For these MRC formats, the text or lineart mask can also be compressed losslessly using Group4, Lempel-Ziv, or arithmetic coding. However, there are several problems associated with the current use of a binary text or lineart mask. First, regardless of the compression method used on the text or lineart mask, the text or lineart, when rendered, has stair-steps on nearly horizontal or vertical lines. The text or lineart image quality suffers from severe aliasing when sub-sampled. The poor quality is also evident when viewed at a higher resolution on a cathode ray tube (CRT), where the character boundaries display the noisiness of individual pixels. Another weakness of the conventional method is the baseline jitter problem when connected component tokens are used. It is very difficult to avoid visible baseline jitter when tokens are substituted, because the vertical alignment of individual characters is susceptible to the noise on character boundaries introduced by thresholding the grayscale character image to binary.

These image quality deficits, stemming from the binary character of the text or lineart, make the conventional MRC format unacceptable for applications requiring that the compression loss is not observable, such as for a bookscanner where a visually lossless archival gray image must be saved.

SUMMARY

The exemplary embodiments of the present invention ameliorate or significantly resolve these problems with conventional methods and systems of storing and generating image data in rendering apparatuses at a relatively small cost in additional storage. Such problems can be rectified to some extent, and at some cost, by allowing use of a grayscale text or lineart mask. This can be done within the MRC format in a number of ways. Alternatively, another (mask, image) pair may be added for the boundary pixels, i.e., a pixel that has at least one of its eight nearest neighbors being of a color opposite to the pixel's color, of the text or lineart mask. Additionally, methods to render these boundary pixels, e.g., without using an explicit layer pair, may be implemented. Such solutions can be made with only a relatively small incremental cost in storage.

The present invention provides a system and method for storing and generating anti-aliased text or lineart from document image files to improve the appearance of rendered text or lineart at both low and high resolutions. Each exemplary embodiment of the invention achieves the goals with minimal cost in additional storage and rendering complexity.

The exemplary embodiments of the invention generate an anti-aliased grayscale version of a text or lineart mask used within an ordered set of mask/image pairs. The grayscale data can be stored with either lossless compression or with lossy compression.

The exemplary embodiments of the present invention may also be applied to methods for anti-aliasing compressed representations of color images. To interpolate between the low resolution foreground and background color images, three values, e.g., for red, blue and green color separations, must be available for each boundary pixel.

All exemplary embodiments involve either generating or saving pixel values for pixels near the boundaries of the text or lineart mask, and using these values in the rendering process to smooth the visual appearance of the boundaries. If the data is compressed, the compressed representation for the pixels associated with the text or lineart mask and its boundary can be either saved as a set of full page images, or as a set of tokens that typically represent connected components in the foreground image.

The exemplary embodiments of the present invention separately provide improved display and print rendering of MRC-compressed images.

The exemplary embodiments of the present invention separately provide means for providing anti-aliased text or lineart data while minimizing costs of additional storage and rendering complexity.

It is preferred that the exemplary embodiments of the invention are implemented in conjunction with the processing of images from documents that contain different types of data, e.g., MRC.

The first exemplary embodiment uses high resolution grayscale scans. The second through fourth embodiments may be implemented with a combination of a high resolution binary scan and a low resolution grayscale scan. The fifth embodiment uses very high resolution binary scans.

The first through fourth embodiments provide methods that use an explicit or implicit extra MRC mask/image pair for the boundary pixels of the text or lineart mask. Methods according to the fifth embodiment generate the gray boundary pixels at high resolution directly from a very high resolution binary representation of the text or lineart mask.

The second and third exemplary embodiments classify the boundary pixels of each type (ON and OFF) depending on their neighboring pixels in the text or lineart mask image, and substitute a specific pixel value for each type globally. Additionally, second exemplary embodiment uses an adaptive algorithm that computes the best pixel values from the image; the other uses pre-computed pixel values for similar images. Additional storage for this method is insignificant or nil.

The third and fourth embodiments provide methods that can be used with current scanners, e.g., high resolution is 300 ppi binary, and current MRC formats, without any additional storage requirements.

The fourth method does not use information about the neighborhood of the boundary pixel (in the mask), but instead just substitutes a single global value for boundary pixels of each type.

The fifth exemplary embodiment substitutes the original pixels directly into the boundary. The quality and compressibility are controlled by the quantization applied to the stored pixels. The fifth method requires a very high resolution binary scan to generate the text or lineart mask at 600 ppi or greater. It then generates the anti-aliasing boundary values at 300 ppi by filtering and down-sampling. One of the simplest methods for doing so is the scale-to-gray conversion.

BRIEF DESCRIPTION OF THE DRAWINGS

These and other objects of the present invention will be readily appreciated and understood from consideration of the following detailed description of exemplary embodiments of this invention, when taken with the accompanying drawings, in which:

FIG. 1 shows a high resolution original scanned image;

FIG. 2 shows the standard MRC version of the image shown in FIG. 1;

FIG. 3 shows an original scanned image after 4× grayscale sub-sampling;

FIG. 4 shows a cleaned MRC version of the image shown in FIG. 3 with binary mask after 4× sub-sampling;

FIG. 7 shows an image rendered using a binary mask;

FIGS. 8-11 show a set of images, corresponding to FIG. 7, rendered using selection of original pixels on the boundary, quantized to two, three, four and five bits in accordance with the first exemplary embodiment;

FIG. 12 shows an original image, as scanned, using all eight bits, and corresponding to FIGS. 8-12;

FIG. 21 shows a magnified text fragment that is produced by substituting the mean values shown in FIGS. 19 and 20 globally for the boundary pixels using 4-connected median adapted pixel values in accordance with the second exemplary embodiment;

FIG. 22 shows the result of the 4× sub-sampled image corresponding to FIG. 21;

FIG. 23 shows the magnified text fragment that is produced by substituting the mean values shown in FIGS. 19 and 20 globally for the boundary pixels using 8-connected median adapted pixel values in accordance with the second exemplary embodiment;

FIG. 24 shows the result of the 4× sub-sampled image corresponding to FIG. 23;

FIG. 26 shows the magnified text fragment that is produced with a grayscale mask boundary using a non-adapted linearly interpolated approximation to 4-connected median pixel values in accordance with the third exemplary embodiment;

FIG. 27 shows the result of the 4× sub-sampled image corresponding FIG. 26;

FIG. 29 shows the magnified text fragment that is produced with all pixels of the interior boundary set to a single threshold-dependent value, and all pixels of the exterior boundary set to another threshold-dependent value in accordance with the fourth exemplary embodiment;

FIG. 30 shows the result of the 4× sub-sampled image corresponding FIG. 29;

FIG. 32 shows the magnified text fragment that is produced with all pixels of the interior boundary set to a single threshold-dependent value, and all pixels of the exterior boundary set to another threshold-dependent value in accordance with the fourth exemplary embodiment; and FIG. 33 shows the result of the 4× sub-sampled image corresponding FIG. 29.

DETAILED DESCRIPTION OF EMBODIMENTS

Figure 5:
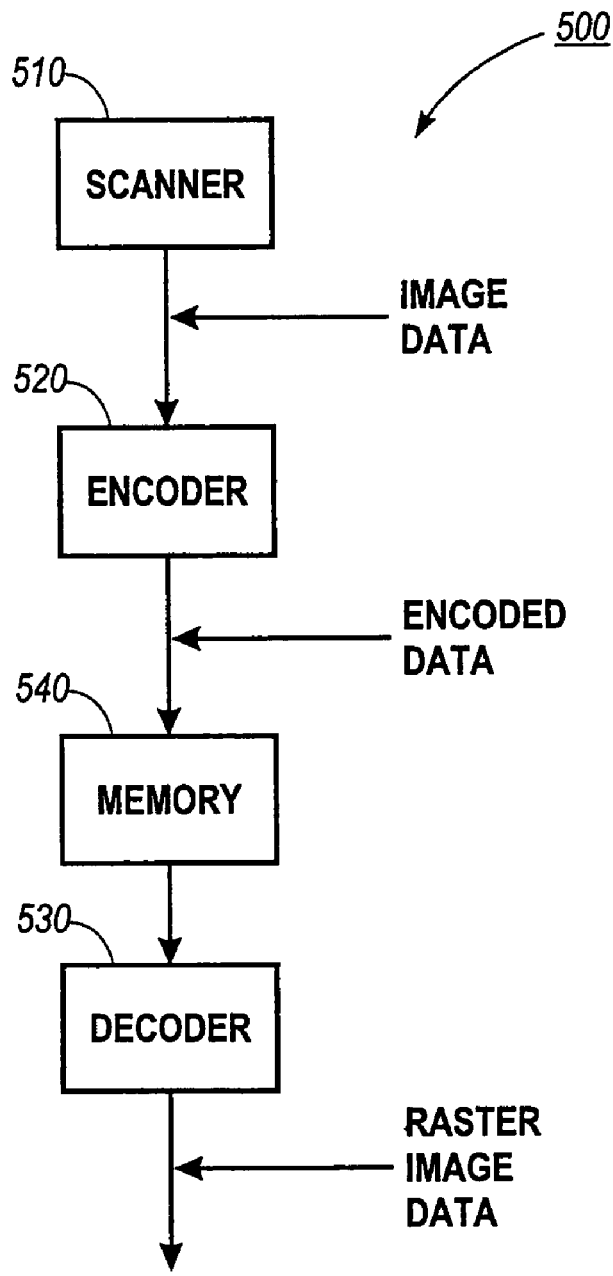
FIG. 5 shows a schematic illustration of an image rendering system that implements each of the first through fifth exemplary embodiments.

Each of the exemplary embodiments of the invention assigns gray values to the boundary pixels of the text or lineart mask. Each of these exemplary embodiments provides methods for grayscale anti-aliasing that are extended to color images, for text or lineart masks that are compressed either as images or as tokens. It is foreseeable that color rendering of anti-aliased tokens will have a significant affect on scanning devices.

Presently, scanning systems typically perform a 300 ppi binary scan for high resolution foreground components, and a 100 ppi color scan for foreground and background color images. The present invention provides the capability of using a grayscale value for the boundary pixel to render, by interpolation, color pixels when the text or lineart mask is compressed either as a full image or in tokens, and using any of the five exemplary embodiments of the invention.

The present invention is of use in any situation where it is desirable or necessary to render the text and lineart at greater than 300 binary ppi in an image. This is of particular use when printing, to eliminate obvious stair-steps in lines that are nearly horizontal or vertical, when viewing a magnified image, e.g., a 300 ppi image on an 80 ppi CRT, or when viewing a highly sub-sampled image, as when attempting to image an entire page scan in a window on a CRT display. When lossy token compression is used for the text or lineart mask, implementation of the exemplary embodiments also improves the appearance of printed and displayed text or lineart by reducing the baseline jitter that is difficult to handle satisfactorily when using binary tokens at 300-400 ppi.

It is now recognized that a MRC image architecture is flexible enough to provide high image quality with excellent compression, and standardization efforts are under way. The present invention fits well into the MRC architecture. As explained below, some of the exemplary embodiments utilize an additional image layer, others rely on the use of higher resolution binary masks; others provide an improvement in rendering from current MRC compressed images, altering either the specific set of MRC layers or the data that is stored in them.

Exemplary embodiments of the invention may be used in conjunction with a 300 ppi grayscale scan and a 100 ppi color scan. The high resolution scan, i.e., 300 ppi, is performed in grayscale because this permits the use of adaptive thresholding to generate the binarized text or lineart mask. If instead a binary high resolution scan is used, where the scanner has performed a global thresholding, the text or lineart mask can be flawed in regions where the background is incorrectly thresholded. Thus, it is preferred that a file format has the high resolution grayscale values for boundary pixels available.

It is preferred that the file format for storing the foreground mask as tokens is extensible. In addition to a token index and location, which are currently saved, the color, character and font ID, and anti-aliasing information can also be stored with each token instance.

The importance of anti-aliasing is most evident for document images viewed on a display. Without anti-aliasing, at very high resolution, such as the full resolution of the original binary scan, edge pixellation effects are quite noticeable. And at low resolution, e.g., 3-4× sub-sampling, the aliasing due to sub-sampling of a binary mask severely compromises legibility of small text.

Therefore, the present invention is directed at solving problems of aliasing, noisy characters, and baseline token jitter described above. Accordingly, the system and method allow images to be displayed at both high and low (sub-sampled) resolution, without the defects evident from thresholding. The exemplary embodiments of the invention provide a variety of approaches for achieving this capability in the context of a layered MRC format. The exemplary embodiments provide improved visual quality, achievable compression, ease of implementation, and speed of decompression. Therefore, the exemplary embodiments achieve improved rendering.

In the detailed explanation of the exemplary embodiments, high resolution data means a 300-400 ppi binary or grayscale image. Very high resolution binary data refers to a binary image at 600 ppi or greater.

Images can be transformed between high resolution gray and very high resolution binary, and vice-versa. In the up-resolution direction, i.e., high gray resolution to very high binary resolution, an interpolative gray-to-gray expansion is followed by thresholding to binary. In the down-resolution direction, i.e., very high binary resolution to high gray resolution, a scale-to-gray conversion is used, which is typically a low-pass filter followed by sub-sampling.

To implement some of the exemplary embodiments, e.g., the first and fifth embodiments, it is necessary to acquire either a very high resolution binary scanned image (fifth embodiment) or a high resolution grayscale scanned image (first embodiment) with at least 2 bits per pixel (bpp) and preferably 4 bpp. Because these images can be interconverted, each of the first and fifth embodiments requires either a high resolution gray or very high resolution binary image because the method and system can acquire the necessary data from either type of image data. For example, if a method requires a very high resolution binary image, it can directly obtain the image data or obtain it from a scanned high resolution gray image.

However, the second through fourth embodiments do not require anything beyond standard high resolution binary scanned image data.

All embodiments generate or save pixel values for pixels near the boundaries of the text or lineart mask, and use these values in the rendering process to smooth the visual appearance of the boundaries. There is no need to explicitly store a mask that identifies the boundary pixels of the text or lineart mask, because these are easily derived from the text or lineart mask itself.

A compressed representation for pixels associated with a text or lineart mask and its boundary can either be saved as a set of full page images, or as a set of tokens that typically represent connected components in the foreground image. Although specific factors affect anti-aliasing a token representation of a text or lineart mask, the method of compressing the text or lineart mask does not conceptually affect the image quality.

During description of the five exemplary embodiments, various experiments were developed to provide examples to exemplify the operation and resulting benefits of the embodiments. All examples relate to an image of text in 8 pt. font, that was scanned at 300 ppi and 8 bpp. High resolution display examples use a single word of the text. Low resolution examples use a larger block consisting of about 10 lines of text. High resolution display examples are magnified about 7×, relative to the size they would have if rendered at a scan resolution on a 300 ppi printer. At this resolution, the image data are about twice as big as they would appear at full (300 ppi) resolution on an 80 ppi monitor. The low resolution images are derived from sub-sampling the full resolution image by 4×, and then printing it at a size roughly comparable to both the size on the original scanned page and the direct display on an 80 ppi screen. Each pixel in the sub-sampled image is thus rendered as approximately a 4×4 block of half-toned printed pixels.

In the experiments implementing MRC, a globally adapted threshold value (152) is used for extracting the binary text or lineart mask. The method sub-samples pixels from the image at a specified rate, e.g., 8×, and forms a histogram of pixel values with overlapping bins. The lightest bin to have more than a given fraction of all the pixels, e.g. 15%, sets the background value. This background value is adjusted downward to determine the global threshold to be used.

Once the text or lineart mask has been identified, the text or lineart mask boundary pixels are brought up to the general background level using a small (5×5) grayscale dilation. This grows the lighter background pixels through the boundary pixels, and it also lightens and smoothes the background. Superposing the text or lineart mask on this smoothed background gives the rendered MRC image, as it is currently done with a binary text or lineart mask.

FIG. 1 shows the high resolution original scanned image and FIG. 2 shows the standard MRC version. If the original image was sub-sampled 4× and displayed on an 80 ppi monitor, the result is barely legible. FIG. 3 shows in print approximately what would be seen on a display screen. However, when the standard MRC image with binarized mask is sub-sampled 4×, as shown in FIG. 4, the results are not legible.

In each of the exemplary embodiments except for the fifth embodiment the text or lineart mask is decomposed into two parts: interior and boundary. The interior part can be constructed from the binary text or lineart mask, by removing the ON boundary pixels, i.e., those ON pixels that are touching an OFF pixel. A morphological erosion of the single mask using a 3×3 structuring element gives a simple implementation. However, the boundary part is composed of all boundary pixels to the mask, both ON and OFF; namely, any pixel in the text or lineart mask that is adjacent, in an 8-connected sense, to a pixel of the opposite value. It is the union of (1) the pixels removed in constructing the interior part of the text or lineart mask and (2) the OFF pixels in the background that are adjacent to those boundary pixels. An implementation for construction of the boundary part performs the exclusive or operation, "XOR", of the erosion and dilation of the text or lineart mask, with both morphological operations using a 3×3 structuring element.

The first through fourth exemplary embodiments set the interior pixels to black. However, each exemplary embodiment differs in how it handles the boundary pixels.

FIG. 5 illustrates a schematic diagram of an image rendering system 500 implementing the exemplary embodiments of the present invention. Each of the exemplary embodiments may be implemented within the image rendering system 500. As shown in FIG. 5, the image rendering system 500 includes a scanner 510, an encoder 520, a decoder 530, memory 540. The scanner 510 is coupled to the encoder 520 and provides scanned image data to the encoder 520. The encoder 520 is also coupled to the memory 540. The memory 540 is also coupled to the decoder 530. The decoder may be incorporated in an image renderer, for example, a print engine with, e.g., a conventionally configured flying spot raster output scanner, an image rendering device for displaying an image on a display screen, etc.

In accordance with a first exemplary embodiment, the scanner 510 scans an image to provide image data. The image data is provided to the encoder 520 that encodes the image data. Such encoding may include compression or other beneficial data manipulation. Encoding begins by identifying boundary pixels within the image data provided by the scanner 510. These boundary pixels, i.e., the actual scanned pixels on the boundary of the text or lineart mask, appropriately quantized, are saved in memory 540 by the encoder 520 for use subsequently in rendering the image.

In accordance with the first exemplary embodiment of the invention, anti-aliasing of the text or lineart data begins with a special scanning scheme, e.g., either binary very high resolution or grayscale high resolution, used to produce high resolution grayscale data, e.g., 300-400 ppi. Encoding is not performed in an adaptive manner. Therefore, no global pixel value assignments are computed from the scanned image. There is no connectivity utilized. Therefore, the values of connected neighbors of a boundary mask pixel are not used in determining the pixel value assignments encoded data that is stored in memory 540. The individual derivation of grayscale boundary pixels is consistent with MRC in that the boundary pixels constitute a (mask, image) pair, where the mask is just the boundary mask described above, and the image consists of 0s (or 1s) everywhere except under the boundary mask, where the pixel value represents the actual value, quantized to some number of significant bits. The boundary pair resulting from encoding according to the first exemplary embodiment is explicit. Therefore storage of an extra MRC boundary mask/image pair in memory 540 is required to subsequently render the image.

Figure 6:
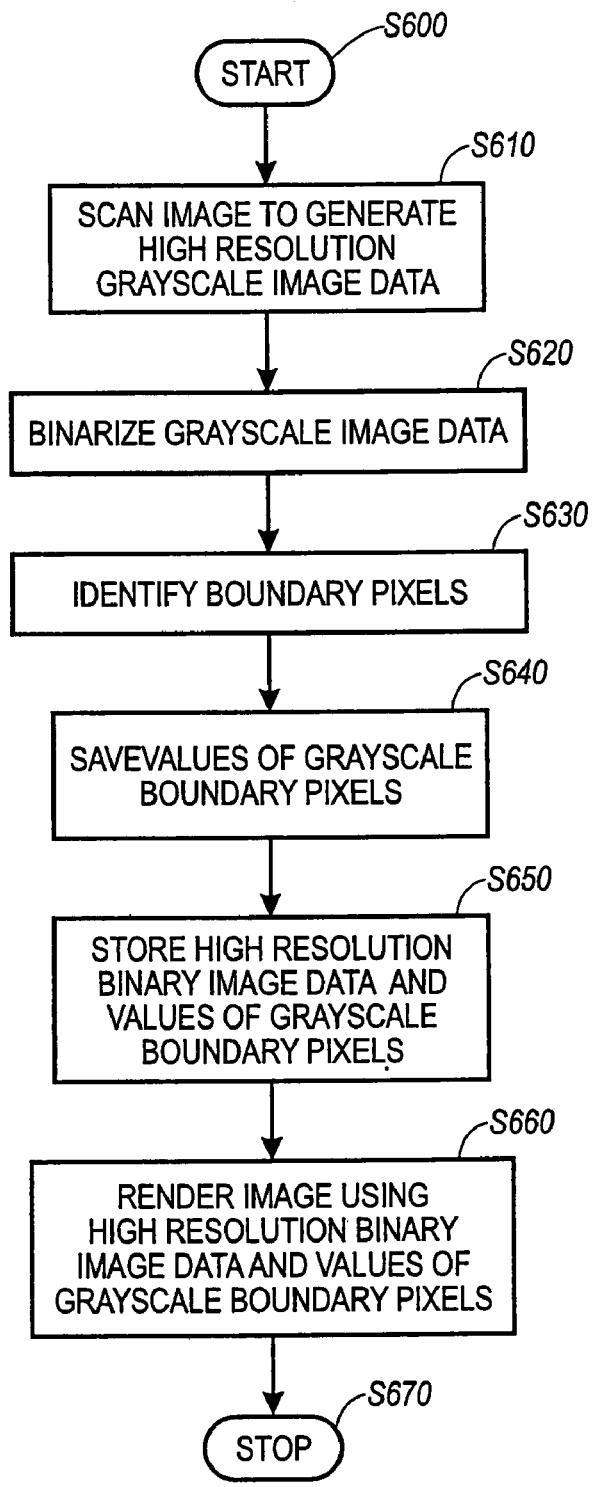
FIG. 6 shows a flowchart outlining a method of image rendering in accordance with the first exemplary embodiment.

FIG. 6 shows a flowchart indicating the flow of a method for providing anti-aliased text and lineart data in accordance with the first exemplary embodiment. The method begins in step S600 and control proceeds to step S610. In step S610, a special scan is performed to generate the grayscale image data at high resolution. Control then proceeds to step S620. In step S620, the grayscale image data is binarized to produce high resolution binary data using a set threshold. Control then proceeds to step S630, in which the boundary pixels of the binarized image data are identified and control proceeds to step S640. In step S640, the grayscale values of the boundary pixels identified in step S630 are stored and control proceeds to step S650. In step S650, the high resolution binary pixel data and the stored grayscale values of the boundary pixels are stored. Control then continues to step S660. In step S660, the high resolution binary pixel data and the grayscale values of the boundary pixels values are used to render the image and control proceeds to step S670. In step S670, the method ends.

During individual derivation of grayscale boundary pixels, the more bits retained, the more similar a subsequently rendered image will be to the original, scanned image, and the more expensive the storage. To illustrate, FIGS. 7-12 show the rendering results with some magnification, as in FIGS. 1 and 2. FIG. 7 shows an image rendered using a binary mask on cleaned background. FIGS. 8-11 show an image rendered in which the boundary pixels are displayed, quantized to two, three, four and five most significant bits, respectively. FIG. 12 shows the original scanned image.

Figure 13:
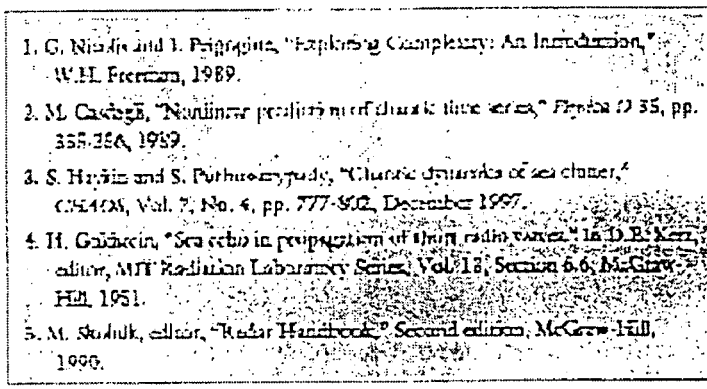
FIGS. 13-15 show rendering results where the boundary pixels are quantized to two, three and four most significant bits, respectively.
Figure 14:
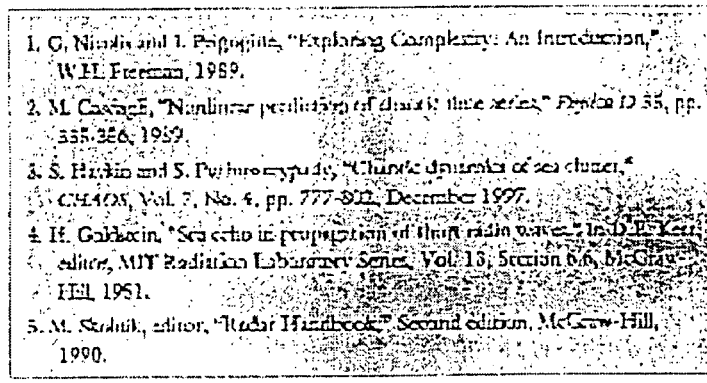
Figure 15:
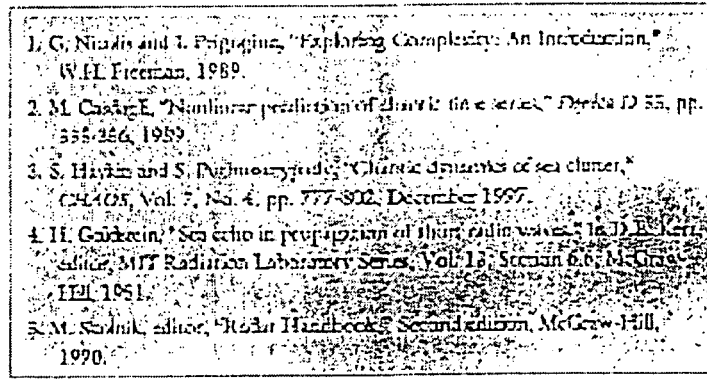

It is also instructive to see the images of text when treated this way and then subsampled by 4×. FIGS. 13-15 show rendering results where the boundary pixels are quantized to two, three and four most significant bits, respectively. Comparing with the use of a binary mask in FIG. 7, it is evident that anti-aliasing is provided by rendering the boundary region in gray tones. Further, much of the anti-aliasing effect is provided by the two most significant bits. When the image is rendered on a display screen, the difference amongst these three images is even more apparent, but even there, the use of three and four most significant bits give diminishing returns.

In the data file holding the image data, only the original single foreground mask needs to be stored because the interior and boundary masks are easily derived from it, as described above. The boundary pixels, when quantized to two or three bits, are stored in a full boundary image, where all non-boundary pixels are given the value zero (or max). This image should compress reasonably well using Lempel-Ziv. Alternatively, since the boundary pixel locations are known from the mask, it is not necessary to store the boundary pixels within a full image. Instead, the boundary pixels can be stored in a packed sequential array, in raster scan order, and their location in the image can be inferred from the foreground mask.

Figure 16:
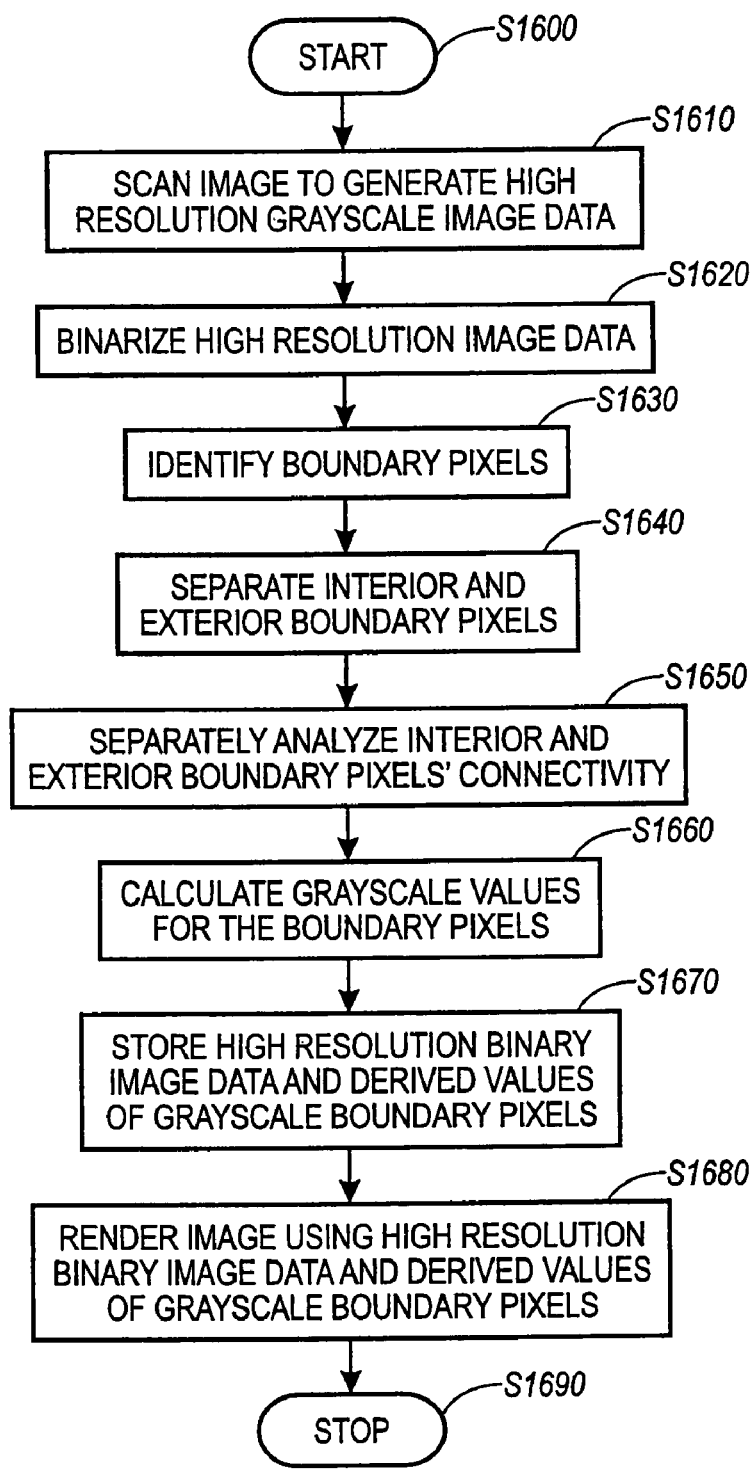
FIG. 16 shows a flowchart outlining a method of image rendering in accordance with the second exemplary embodiment.

FIG. 16 shows a flowchart indicating the flow of a method for providing anti-aliased text and lineart data in accordance with the second exemplary embodiment. The method begins in step S1600 and control proceeds to step S1610. In step S1610, the image is scanned specially to determine the actual grayscale values of the boundary pixels at high resolution. Control then proceeds to step S1620. In step S1620, the grayscale image data is binarized to produce high resolution binary data using a set threshold. Control then proceeds to step S1630. In step S1630, the boundary pixels are identified and control proceeds to step S1640. In step S1640, the boundary pixels are separated into interior and exterior pixels, which are boundary pixels that are ON and OFF, respectively, in the text or lineart mask. Control then proceeds to step S1650, in which each subset, e.g., interior and exterior pixels, are analyzed separately to determine connectedness to determine an appropriate gray value for each of the boundary pixels. Performance of step S1650 is based on the assumption that the grayscale value of the original boundary pixel is correlated with the number of connected pixels in the mask image of opposite (or same) color. Subsequently, control proceeds to step S1660, gray scale values are calculated for the boundary pixels and control proceeds to step S1670. In step S1670, the high resolution binary boundary pixel values and the derived grayscale values of the grayscale pixel data are stored in memory as compressed data. Control then proceeds to step S1680 in which the high resolution binary boundary pixel data and the derived grayscale values of the boundary pixels are used to render the image and control proceeds to step S1690. In step S1690, the method ends.

Two pixels are 4-connected if their positional relation is such that a second pixel is positioned adjacent to a first pixel to the immediate left, right, top or bottom of the first pixel. Two pixels are 8-connected if their positional relation is such that the second pixel is positioned adjacent to the first pixel to the immediate left, right, top or bottom or to the immediate upper-left, upper-right, lower-left or lower-right of the first pixel. As mentioned above, an assumption is made that the grayscale value of the original boundary pixel is correlated with the number of connected pixels in the mask image of opposite (or same) color. For example, an interior (ON) pixel with three 4-connected OFF pixels is expected to be lighter than one with only one 4-connected OFF pixels. Therefore, each of the boundary pixels of each type is analyzed in the image to form an estimate of its gray value from the connectivity. This estimate is formed by building a histogram of pixel values for each type and for each connectivity, and taking the median pixel value.

Step S1640 may be performed using either type-4 or type-8 connectivity. Experiments have been performed using both type-4 connectivity (analyzing the four orthogonal pixels surrounding a sampled pixel) and type-8 connectivity (analyzing the four orthogonal pixels as well as the four diagonal pixels surrounding the sampled pixel. The differences in results between type-4 and type-8 are not large. However, the type-4 connectivity evaluation results are discussed below in more detail because they are easier to visualize.

Figure 17:
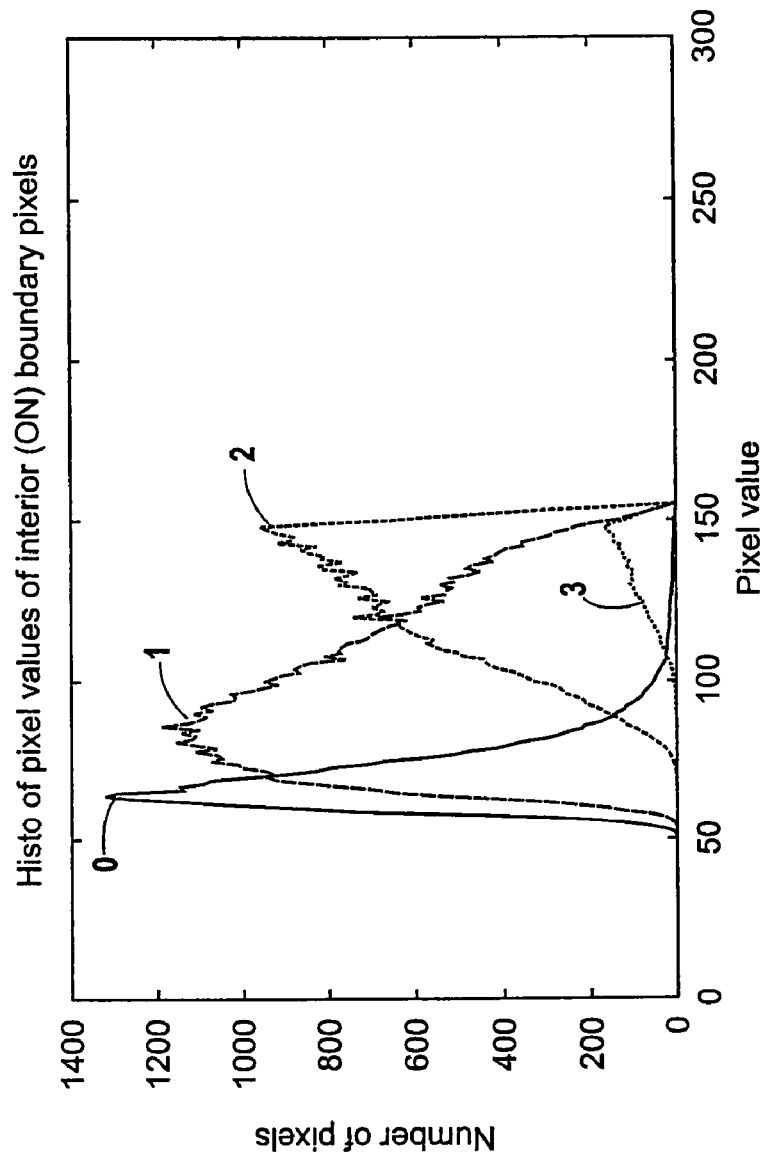
FIG. 17 shows a chart of histograms of interior boundary pixels for, 0, 1, 2 and 3 four-neighbors of opposite (OFF) color.
Figure 18:
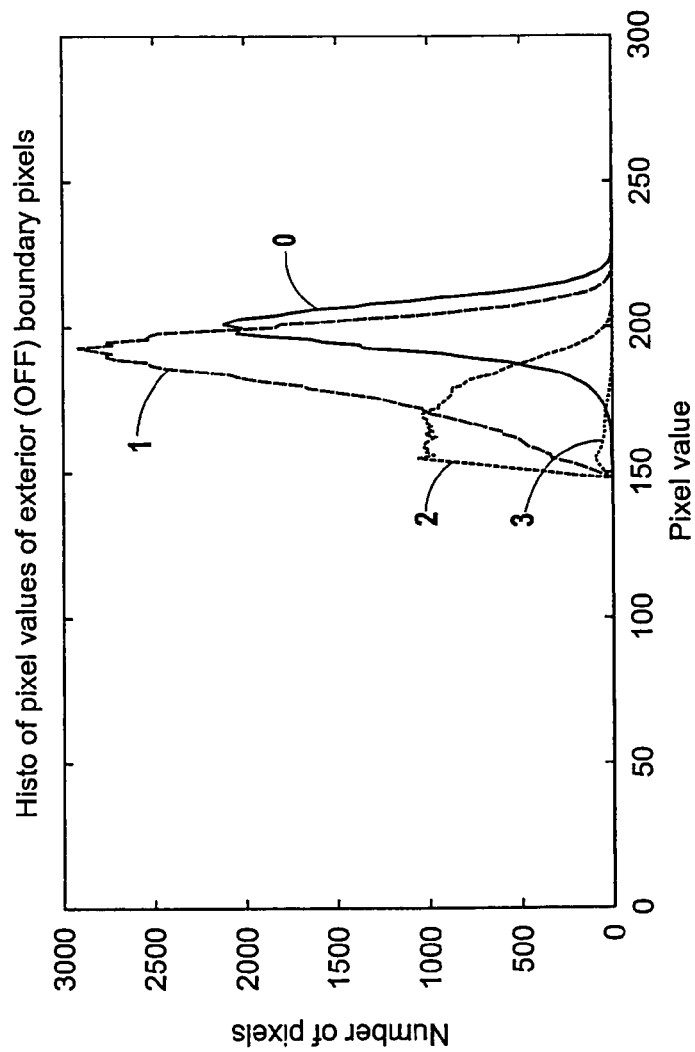
FIG. 18 shows a chart of histograms of exterior boundary pixels for, 0, 1, 2 and 3 four-neighbors of opposite (ON) color.

To illustrate the validity of the assumption of pixel value correlation with connectivity, FIGS. 17 and 18 show a plot of histograms for interior and exterior boundary pixels respectively. FIG. 17 shows the histograms of interior boundary pixels, for 0, 1, 2 and 3 four-neighbors of opposite (OFF) color. FIG. 18 shows the histograms of exterior boundary pixels, for 0, 1, 2 and 3 four-neighbors of opposite (ON) color.

Four curves can be distinguished in each of FIGS. 17 and 18. In FIG. 17, the interior histogram, these curves are for 0, 1, 2, and 3 connected pixels of opposite (OFF) color. There are few cases where four connected pixels are OFF, and during analysis these pixel values are set to the threshold value used for constructing the text or lineart mask. In FIG. 18, the exterior histogram, the four curves are again for 0, 1, 2 and 3 connected pixels of opposite (ON) color. There are few cases with pixels with four ON 4-neighbors. During analysis, these pixel values are also set to threshold value used for constructing the text or lineart mask. In the data shown in FIGS. 17 and 18, the threshold value used for constructing the text or lineart mask was 152. As a result, it should be recognized that there are some pixels in each histogram that cross over the threshold that was used to generate the mask. This cross over is merely an artifact of the use of a smoothing filter of length 7 that was applied to the histograms.

Figure 19:
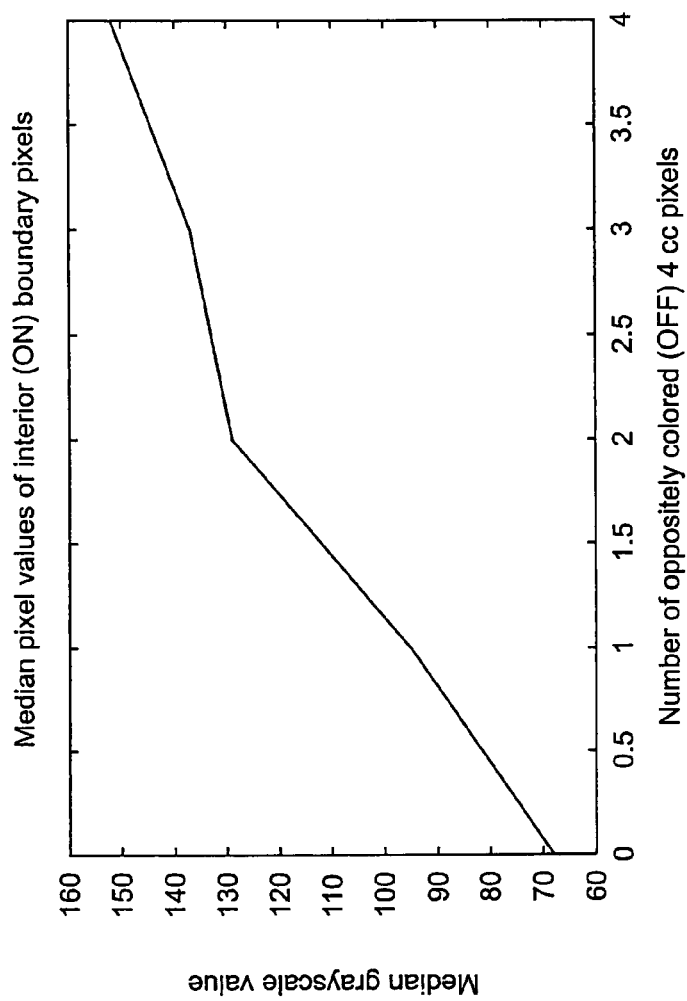
FIG. 19 shows a chart of the median pixel values found from the unsmoothed histograms for the interior boundary pixels.
Figure 20:
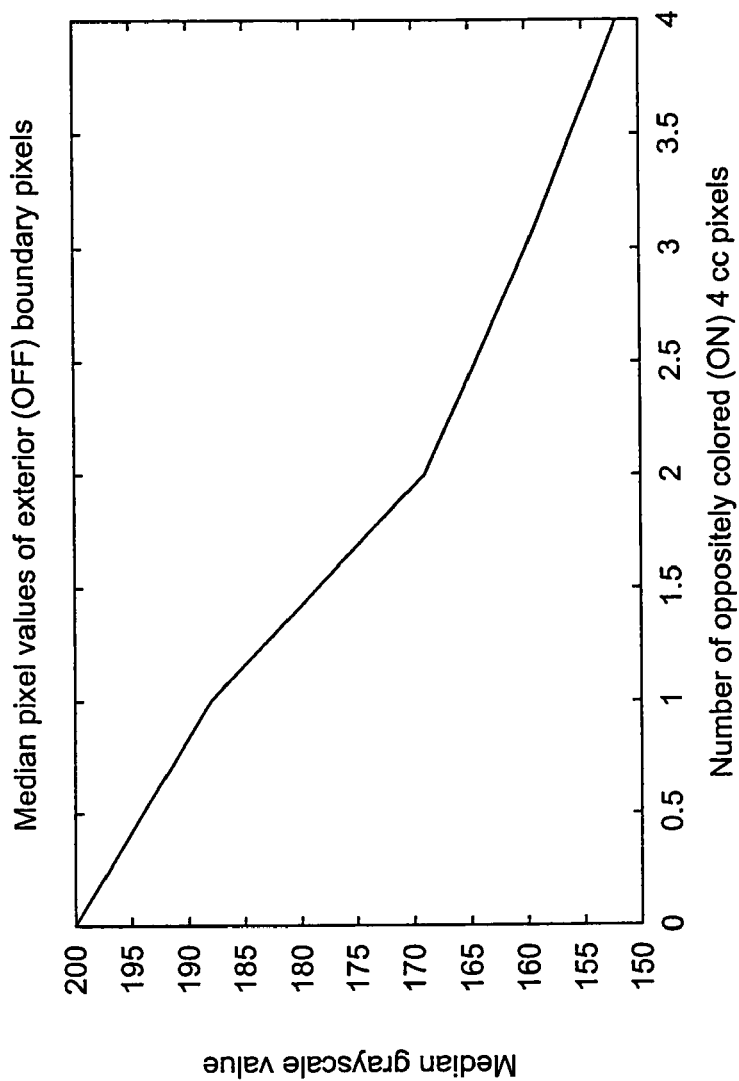
FIG. 20 shows a chart of the median pixel values found from the unsmoothed histograms for the exterior boundary pixels.

The median pixel values are found from the (unsmoothed) histograms, and are shown for interior and exterior boundary pixels in FIGS. 19 and 20, respectively. In each of these Figures, the median pixel value is plotted against the number of mask neighbors of opposite color.

Figures 21, 22, 23, 24:
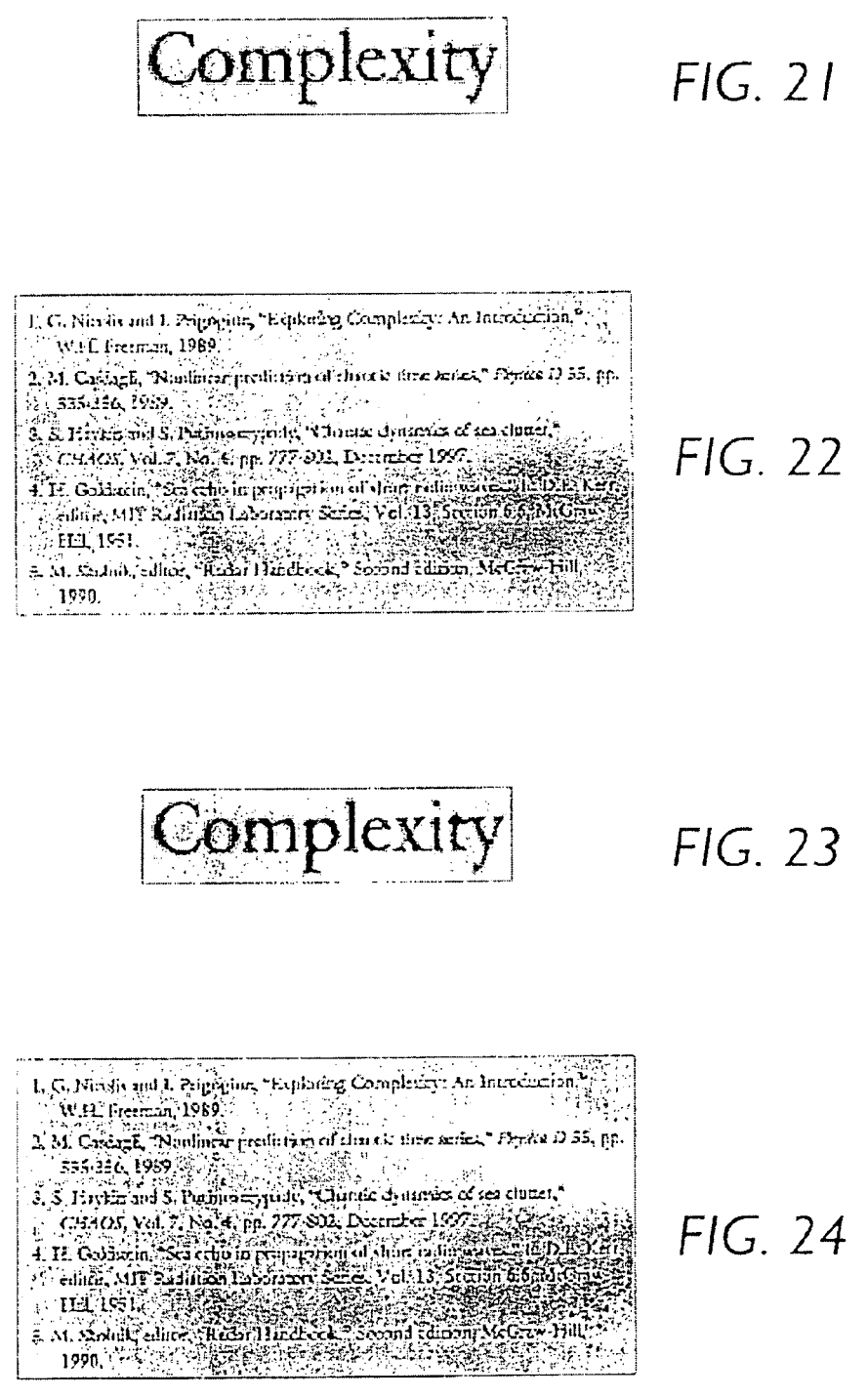

FIG. 21 shows a magnified text fragment that is produced by substituting the mean values shown in FIGS. 19 and 20 globally for the boundary pixels. FIG. 21 shows the MRC image with grayscale mask boundary using 4-connected median adapted pixel values. The magnified text fragment shown in FIG. 21 is noisier than the corresponding fragment of the original image but storing the image data only requires storing the ten median values in addition to the standard MRC data. FIG. 22 shows the result of the 4× sub-sampled image.

FIG. 23 also shows the magnified text fragment that is produced by substituting the mean values shown in FIGS. 19 and 20 globally for the boundary pixels. However, FIG. 23 shows the MRC image with grayscale mask boundary using 8-connected median adapted pixel values. FIG. 24 shows the result of the 4× sampled image. Comparison of FIG. 21 and FIG. 23 indicates that there is little apparent difference in image quality between the 4 and 8 connected versions, when viewed on a display.

In a third exemplary embodiment, non-adaptive, connectivity-dependent global pixel values are generated. If high resolution grayscale values are not available, a set of values may be derived from analysis on similar images. A standard scanning scheme, e.g., binary high resolution, is used to produce high resolution binary data, e.g., 300-400 ppi. The method is not adaptive. Therefore, global pixel value assignments are not computed from the scanned image. However, connectivity is utilized. Therefore, the values of connected neighbors of a boundary mask pixel are used in determining the pixel value assignments. The resulting boundary pair is implicit, which means the extra mask/image pair is constructed to render the image.

Figure 25:
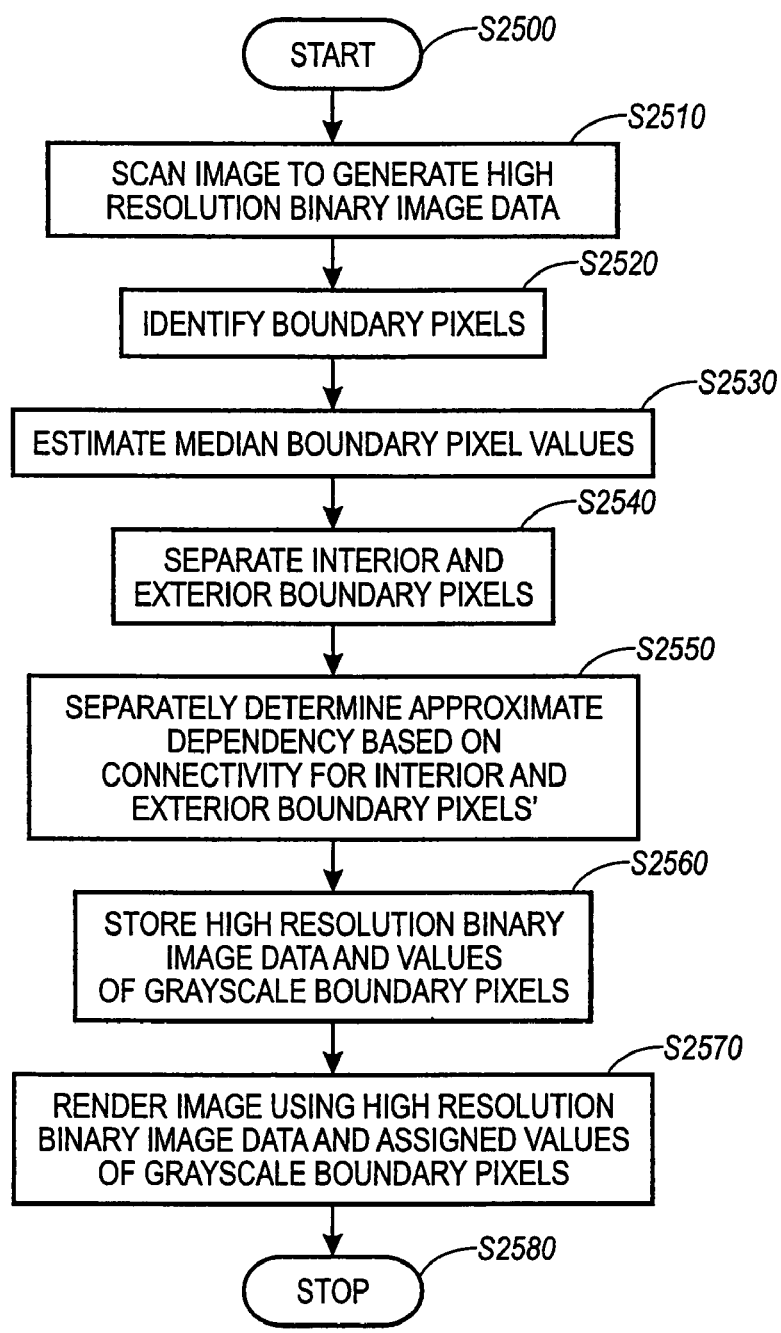
FIG. 25 shows a flowchart outlining a method of image rendering in accordance with the third exemplary embodiment.

FIG. 25 shows a flowchart indicating the flow of a method for providing anti-aliased text and lineart data in accordance with the third exemplary embodiment. The method begins in step S2500 and control proceeds to step S2510. In step S2510, a standard scan is performed to generate the binary image data at high resolution. Control then proceeds to step S2520. In step S2520, boundary pixels are identified and control proceeds to step S2530. In step S2530, an estimate of the median pixel values on the boundaries is performed and control proceeds to step S2540. In step S2530, the estimate is performed based on the observation that, the median pixel value varies approximately linearly with the number of 4-neighbors of the opposite color. In step S2540, the boundary pixels are separated into interior and exterior pixels and control proceeds to step S2550. In step S2550, an approximate dependency on the number of oppositely colored 4-neighbors n is determined from the estimated median pixel values and control proceeds to step S2560. In step S2560, the grayscale values of the boundary pixels and the binary high resolution data are stored in memory. Control then proceeds to step S2570. In step S2570, the grayscale boundary pixel data and the binary high resolution data are used to render the image and control proceeds to step S2580. In step S2580, the method ends.

The third exemplary embodiment is particularly effective when it is not possible to generate a high-resolution grayscale image, from which pixels can either be selected or adapted based on the statistics of the image. In such a case, it is still possible to perform an estimate of the median pixel values on the boundaries, based on the observation that, when segregated by the number of 4-neighbors, the median pixel value varies approximately linearly with the number of 4-neighbors of opposite color. In the third embodiment, the boundary pixels are separated into interior and exterior pixels.

An approximate dependency of the boundary pixel gray value on the number of oppositely colored 4-neighbors n can be determined from median value curves, such as those in FIGS. 19 and 20, by making a linear fit to the data end points (for 0 and 4 neighbors). Therefore, for interior pixels, the pixel value for n=0 is always assumed to be a fraction, for example, 0.45, of the threshold. Also, for n=4, the pixel value is equal to the threshold. Hence, for all values of n, $$val_{in} = 0.45T + (0.138T)n$$

where T is the threshold. Likewise, for exterior pixels, the pixel value for n=0 is always taken to be equal to T plus a fixed fraction, for example, 0.47, of the difference between 255 and T, which reduces to 119+0.53T. Again for n=4, the pixel value is T. Hence, the linear interpolation formula for all values of n is:

$$val_{out} = 119 + 0.53T + (0.117T - 30)n$$

When these values are used in place of the (unknown) actual median values, the image quality is reasonably good. Using this method, the magnified fragment is shown in FIG. 26 and the 4× subsampled image is shown in FIG. 27. FIG. 26 specifically shows a magnified MRC image with a grayscale mask boundary using non-adapted linearly interpolated approximation to 4-connected median pixel values. FIG. 27 shows a MRC image with a grayscale mask boundary using non-adapted linearly interpolated approximation to 4-connected median pixel values after 4× sampling.

In a fourth exemplary embodiment, non-adaptive, connectivity-dependent global boundary pixels are assigned. This is performed by assigning interior boundary pixels a specified global value, and assigning exterior boundary pixels a specified global value. These values can be determined based on the median values in the scanned image, or assigned based on analysis of similar images. A standard scanning scheme, e.g., binary high resolution, is used to produce high resolution binary data, e.g., 300-400 ppi. The method is not adaptive. Therefore, global pixel value assignments are not computed from the scanned image. Furthermore, connectivity is not utilized. Therefore, the values of connected neighbors of a boundary mask pixel are not used in determining the pixel value assignments. The resulting boundary pair is implicit, which means the extra mask/image pair is constructed to render the image.

Figure 28:
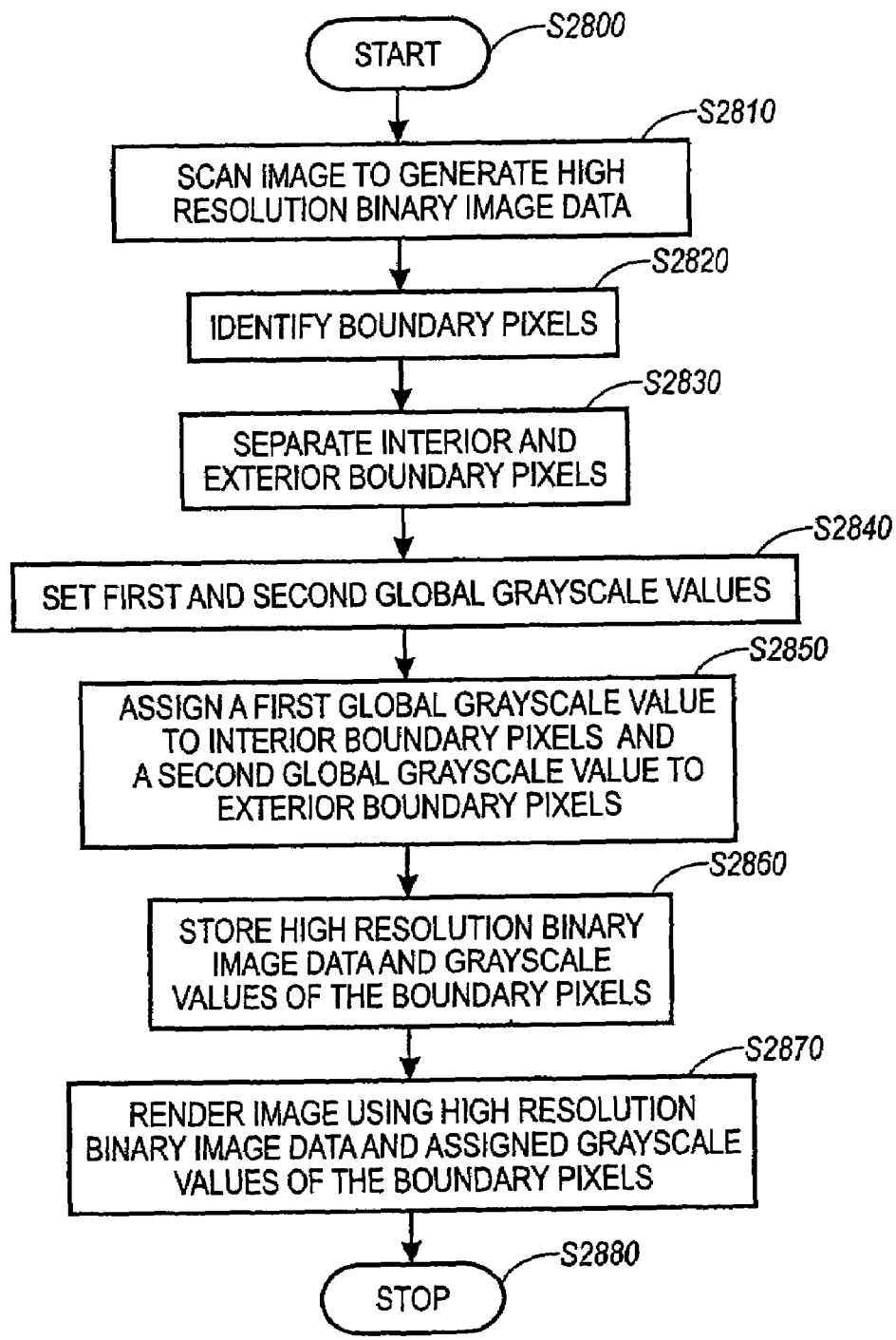
FIG. 28 shows a flowchart outlining a method of image rendering in accordance with the fourth exemplary embodiment.

FIG. 28 shows a flowchart indicating the flow of a method for providing anti-aliased text and lineart data in accordance with the fourth exemplary embodiment. The method begins in step S2800 and control proceeds to step S2810. In step S2810, a standard scan is performed to generate the binary image data at high resolution. Control then proceeds to step S2820. In step S2820, the boundary pixels are identified and control proceeds to step S2830. In step S2830, the boundary pixels are separated into interior and exterior boundary pixels and control proceeds to step S2840. In step S2840, a first global grayscale value is set for the interior boundary pixels and a second global grayscale value is set for the exterior boundary pixels. Control then proceeds to step S2850. In step S2850, the first global grayscale value is assigned to all interior boundary pixels and the second global grayscale value is assigned to all exterior boundary pixels. Control then proceeds to step S2860. In step S2860, the grayscale boundary pixel values assigned in step S2850 and the binary high resolution data provided in step S2810 are stored in memory as compressed data. Control then proceeds to S2870, in which the grayscale boundary pixel values and the binary high resolution data are stored in memory. Subsequently, control proceeds to step S2880, in which the grayscale boundary pixel values and the binary high resolution data are used to render the image and control proceeds to step S2890. In step S2890, the method ends.

Implementation of the fourth exemplary embodiment is performed when high resolution grayscale data is unavailable and simplification of the method for performing anti-aliasing of the text or lineart mask is of heightened importance, for example, in a rendering engine that does not have time or computational ability to determine the number of oppositely colored adjacent pixels for each boundary pixel It is worth noting that at some degree of simplification, rendering results are sufficiently poor so that it makes no sense to simplify further. In this exemplary embodiment, connectivity is ignored, a global value is assigned to all interior boundary pixels and another global value is assigned to all exterior boundary pixels. Therefore, only two parameters are chosen, and these global values can be taken as the median values of representative boundary pixels from other images in which the high resolution gray value is known. These values are found to be approximately $val_{in} = 0.62T$ and $val_{out} = 77 + 0.70T$. The former is determined assuming the median value scales with threshold T as aT, and the latter is determined assuming the median value scales with threshold as T+a(255−T). These are the same forms as were used in the third exemplary embodiment for fitting the point n=0.

The results are illustrated in FIG. 29 for the magnified fragment and in FIG. 32 for the 4× subsampled image. For these images, the interior boundary pixels are set to a threshold value of 95 arid the exterior ones are set to a threshold value of 183. The results are better than using a binary text or lineart mask, but worse than the other methods. The advantage here is that it is not necessary to compute the connectivity of each pixel in the boundary.

In a fifth exemplary embodiment, a direct scale-to-gray is performed from a very high resolution (600 ppi or more) binary mask. A special scanning scheme, e.g., either binary very high resolution or grayscale-high resolution, is used to produce very high resolution binary data, e.g., 600 ppi or greater. The method is adaptive, and local boundary pixel value assignments are computed from the scanned image. The values of connected neighbors of a boundary mask pixel are not used in determining the pixel value assignments. Therefore, there is no need to use an extra mask/image pair to render the image.

Figure 31:
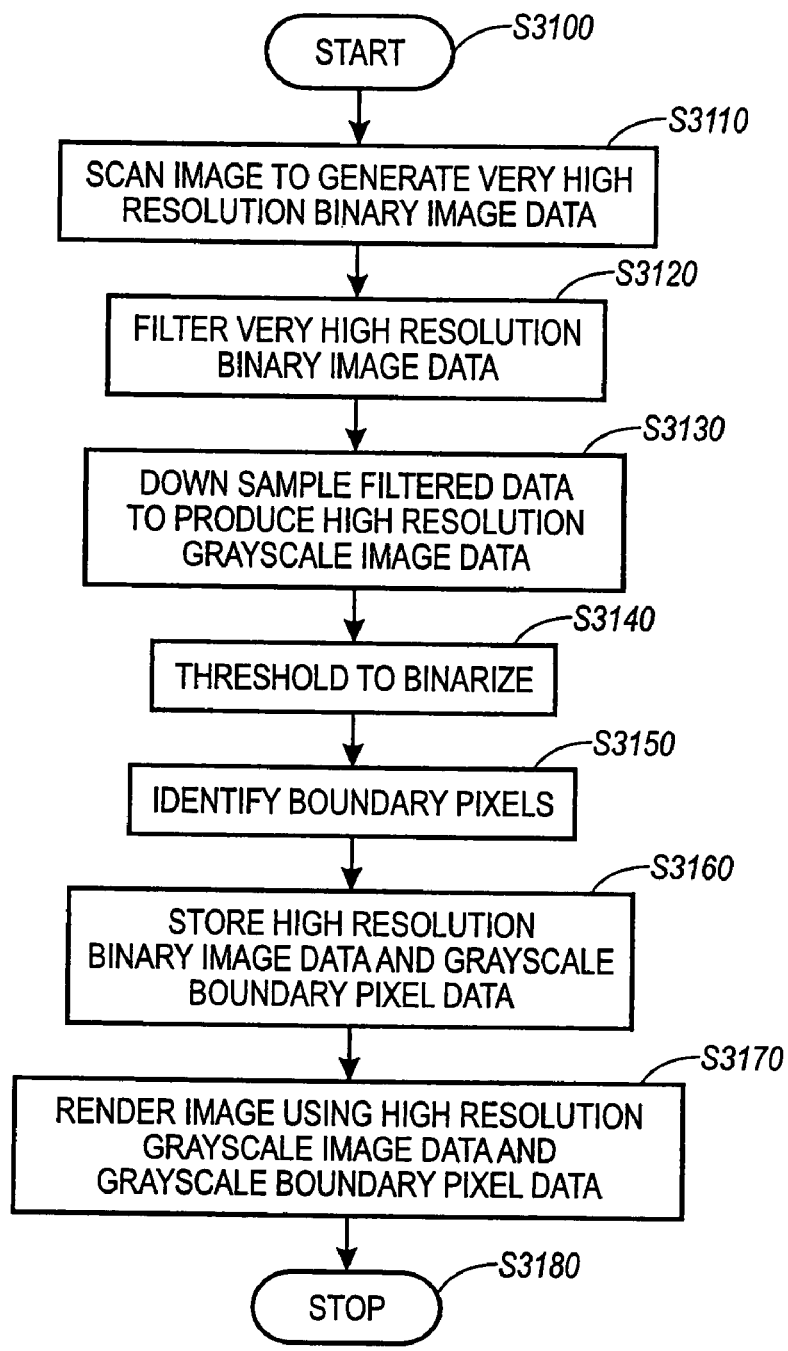
FIG. 31 shows a flowchart outlining a method of image rendering in accordance with the fifth exemplary embodiment.

The fifth exemplary embodiment of the invention is the only exemplary embodiment that does not clearly fit within the MRC framework. FIG. 31 shows a flowchart indicating the flow of a method for providing anti-aliased text and lineart data in accordance with the fifth exemplary embodiment. The method begins instep S3100 and control proceeds to step S3110. Instep S3110, very high resolution binary text or lineart mask data, of 600 ppi or greater, is obtained. The very high resolution binary text or lineart mask data can be obtained from a 300 ppi grayscale image, or scanned directly and control proceeds to step S3120. In step S3120, the text or lineart data is then filtered and control proceeds to step S3130. In step S3130, the filtered data is down-sampled to 300 ppi gray. Subsequently, control proceeds to step S3140, in which thresholding is performed on the high resolution grayscale pixel data to binarize the image data. Control then proceeds to step S3150, in which boundary pixels are identified using the binary image data produced in step S3140. Control then proceeds to step S3150, in which the high resolution binary image data and the grayscale boundary pixel data is stored in memory as compressed data. Control then proceeds to step S3170, in which the compressed data is used to render the image and control proceeds to step S3180. In step S3180, the method ends.

The first step—the reduction from very high resolution binary to high resolution gray—is often called "scale-to-gray", and is typically done by tiling the image preparatory to subsampling, and calculating a gray value for each tile that is proportional to the number of ON pixels in the tile. In this case, the filtering operation is to take a convolution with a constant filter of size equal to the tile. A number of very fast conventional algorithms have been developed for this operation. Additionally, other methods of generating the 300 ppi gray data are useful. For example, the very high resolution binary image may be generated by performing a 2× grayscale expansion on input 300 ppi grayscale image date to rescale from 300 ppi to 600 ppi. Subsequently, the usual thresholding would be performed to generate the very high resolution binary mask which is stored in the file format, and on which the scale-to-gay operation is performed as in this exemplary embodiment. To perform anti-alias boundary pixel rendering from this high resolution grayscale text or lineart mask, while also filtering and smoothing the background, the grayscale text or lineart mask is placed over the unfiltered original background, as follows: (1) lowpass the grayscale text or lineart mask with a very high threshold value, e.g., 250, so that all gray pixels associated with the mask are kept; (2) clean the background with the usual grayscale dilation; and (3) select the gray pixels from the grayscale mask that are under the lowpassed binary version of this mask.

The magnified image fragment resulting from rendering in accordance with the fifth embodiment is shown in FIG. 32. Because the grayscale pixels form a boundary that is only one pixel wide, instead of the usual two-pixel grayscale boundary from the original and the other methods, the boundary edges appear to be sharper. For example, a 4× sub-sampled image is shown in FIG. 33. It appears sharper than images anti-aliased by other means because of the narrow boundary region, and it is comparable legibility to the other methods. In addition to the lack of fuzziness, the boundary pixels have a limited dynamic range, of five levels for the example shown where a 600 ppi binary mask is reduced to a 300 ppi grayscale mask. The grayscale text or lineart mask is quantized to five levels, which requires little more than two bits of data, because a 2× sale-to-gray conversion is performed from a binary mask.

In the MRC format, the binary mask would be stored in a file. However, storage for the 600 ppi binary mask in the file scales approximately linearly with the resolution. Therefore storage requires about double the storage space of the usual 300 ppi text or lineart mask. Thus, for rendering, the stored mask is scaled to gray at the high resolution (300 ppi), and all pixels that are not pure white are incorporated in the rendered image, as described above.

As mentioned above, the exemplary embodiments of the invention may be implemented in combination with lossy text or lineart mask compression by tokens. For example, the present invention may be implemented with lossy compression by connected component tokens. Conventionally, such tokens are binary images that are tiled to compose the text or lineart mask, i.e., the MRC foreground mask. Conventionally, these tokens, i.e., binary tokens, are generated from a binarized image, typically at 300 ppi.

A binary token is usually taken, in the unsupervised classification scheme, to be the first token instance found of a new class of connected components. It is possible to form a composite grayscale token, by suitably aligning and averaging the pixel values in all token instances of a particular class. However, this approach has several major problems: alignment is tricky; it is computationally intensive and if there is only one token instance, the token remains binary.

Use of grayscale tokens alleviates the token substitution baseline jitter problem because gray pixels around the boundary of the token reduce the visual effect of hard pixel boundaries that can vary by ±1 pixel in the standard token replacement algorithm. It also alleviates the anti-aliasing problems on the text or lineart mask in general. Each grayscale token can be considered to have three regions: foreground (ON pixels), boundary (gray pixels) and the remaining (OFF) pixels. The foreground and boundary layer pixels are non-intersecting. For implementing some of the exemplary embodiments of the invention, it may be necessary to decompose the boundary layer into two parts: an interior part, e.g., ON pixels in the binary mask, and an exterior part, e.g., OFF pixels in the binary mask. In no case does the boundary need to be saved, because it is either defined implicitly as the set of boundary pixels in the text or lineart mask or it can be derived from the saved grayscale pixels. It is worth noting, that the grayscale boundary pixels, when saved, achieve most of their effect from the 2 or 3 most significant bits.

Typically, the binary tokens are substituted for the token instances using an alignment based on the bounding boxes of each. For example, the lower-left corner of the token is placed at the lower-left corner of the bounding box of the token instance. Special efforts can be made during compression to align the binary token individually with each token instance in the image, based on pixel locations, e.g., by finding an alignment that minimizes the pixel-wise XOR operation or maximizes the pixel-wise AND operation performed on the two images, or that aligns the center of masses to the nearest pixel. However, if special alignment techniques are not performed, the resulting baseline jitter will be noticeable. This is because the bounding box for the set of token instances can be displaced one pixel up or down (but not both) relative to the best visual alignment during the thresholding process. Then successive tokens in a line of text or lineart can be vertically displaced from the best alignment by up to two pixels with respect to each other because one token can be displaced upwards and the next downwards.

A random set of relative displacements, with a maximum of two, is visible as baseline jitter. If the tokens are optimally aligned with each instance of the token, jitter is significantly reduced, but the maximum relative displacement is still about one pixel. When the tokens are rendered with grayscale anti-aliasing pixels on the boundary, the observable jitter is significantly reduced, whether or not each binary token has been optimally aligned with all of the token instances. It is foreseeable that the observable reduction in baseline jitter using anti-aliased tokens is about a factor of two, depending on the specific method of generating the anti-aliasing pixels. Thus, the maximum relative baseline jitter will be about one pixel for unaligned tokens and about 0.5 pixel for aligned tokens. The jitter in the former case may not be noticeable, and it will surely be unobservable in the latter.

Each of the exemplary embodiments described above may be implemented in conjunction with grayscale token compression. The changes from using full image masks are relatively small. Because the number of tokens will be limited, the extra storage required for these grayscale boundary pixels must be less than that required if the full mask is stored rather than the tokens.

In conjunction with the first exemplary embodiment, the boundary pixels are selected from the original image, appropriately quantized and each token analyzed as two separate layers: foreground and boundary. These layers constitute two images that can be compressed separately. The foreground image is binary and consists of the standard text or lineart mask, eroded to remove the interior boundary pixels. However, if the order of rendering of the layers is specified and the foreground is rendered first and the boundary second, it is not strictly necessary to erode the foreground text or lineart mask because the interior boundary pixels will paint over them.

As explained above in the detailed explanation of the first exemplary embodiment, the boundary pixels in the token can be stored as either a full image or as a packed array of pixels that are just the boundary pixels encountered in a raster scan order. When stored as a full image, the boundary image is grayscale, with the non-boundary pixels taking on a constant value, e.g., zero. When compressed by a universal source coder, e.g., Lempel-Ziv, few bits will be allocated to the non-boundary pixels. Nevertheless, the packed array of boundary pixels will always compress better than the full image.

In conjunction with the second exemplary embodiment, the analysis of grayscale pixel values based on the value in the high resolution grayscale image and the nearest neighbor colors in the thresholded mask is performed as explained above. The grayscale tokens are rendered by analyzing the connectivity of the boundary pixels and making the appropriate grayscale substitutions. There is no need to store an explicit layer (representation) of the boundary pixels. Again, only nine or ten numbers need to be stored when 4- or 8-neighbor connectivity is used, and these grayscale values are used in all the tokens.

In conjunction with the third exemplary embodiment, the grayscale tokens are as explained above, except that the substitution values are known a priori, and are not determined from the image being compressed. Rather, the substitution values are specified depending on whether the pixel is in the interior or exterior boundary, and on its 4- or 8-neighbor connectivity. The binary text or lineart mask is saved, with no extra data, except perhaps for the threshold value that was used to generate the text or lineart mask. It is not necessary to do a high resolution grayscale scan.

In conjunction with the fourth exemplary embodiment, the boundary grayscale pixel values are assigned as explained above based on constants for the interior and exterior boundary, independent of 4- or 8-neighbor connectivity. As in the implementation of the third exemplary embodiment with grayscale token compression, only the threshold value needs to be saved in the file, but the appearance of these tokens is visually inferior because each boundary layer is given a single color. It is not necessary to do a high resolution grayscale scan.

In conjunction with the fifth exemplary embodiment, the tokens are stored at very high resolution (600 ppi or greater), and the location at which the tokens are placed in the image is also stored at this resolution. When the image is to be rendered at lower resolution, a scale-to-gray transform is done separately on each token. As described above in the description of the fifth embodiment, the gray anti-aliasing pixels form a boundary that is one (rather than two) pixels wide, and the edges thus appear sharper. The compressed tokens require approximately twice the storage for the image parts, but the location information for the tokens is not substantially increased. Thus, the increase in storage when using tokens at 600 ppi instead of 300 ppi is much less than a factor of two, which was the increase predicted in the implementation of the fifth exemplary embodiment where the very high resolution binary text or lineart mask is compressed as a full image.

The exemplary embodiments of the present invention may also be implemented to generate anti-aliased text and line graphics in color images. In a typical MRC format, both the foreground and background are represented by low-resolution color images.

The first exemplary embodiment uses the actual scanned values of the boundary pixels. This provides the best results for the rendered boundary pixels, but from a storage view, it is the most storage-wasteful method. When tokens are used, only one set of boundary pixels is stored for each token. For grayscale images, this is straightforward, as described above. However, for color, the fact that each token instance has a different set of colors in both the foreground and background and requires adaptation of the method for generating anti-aliased text data.

A simple method for color anti-aliased tokens in accordance with the first exemplary embodiment can be used if a color scan at high resolution, e.g., 300 ppi, is available. Therefore, implementation of the first exemplary embodiment may require that foreground and background images, which are typically scanned or saved at low resolution, have been scaled appropriately so that corresponding pixels for each location can be identified. For each high resolution color boundary pixel on a token, the three colors are stored as three gray values. Each gray value is computed as a fraction of the gray, i.e., intensity between low-frequency foreground and background images at that location. For example, if a red intensity is halfway between foreground and background red intensities, the red gray value is taken to be 0.5. It also foreseeable that the gray value can be stored with quantized values between 0 and $2^n-1$, for some value of n. These three gray values are thus used for interpolation between foreground and background pixels on the boundary pixels of each instance of the token.

Assume that the foreground and background pixel saturation values for red are $S^r_{fore}$ and $S^r_{back}$, and similarly for blue and green. Also assume the boundary pixel saturation value for red is $S^r_{bdry}$. Then the fraction $S^r_{bdry}/(S^r_{fore}-S^r_{back})$ is stored and the red component of this boundary pixel in each token instance is rendered using this fraction and the local values of $S^r_{fore}$ and $S^r_{back}$.

However, it may not be practical to scan the image with high resolution color so that these three color values are not available separately for each boundary pixel. Therefore, assume instead that only a high resolution grayscale image is available. Each boundary pixel is a weighted average of the contributions from the three, unavailable color values. In such a situation, this grayscale value can be used to store a single value for each token pixel. Specifically, the weighting factors appropriate to the scanner are used to find the weighted average saturations of the nearest pixels in the foreground and background color images. These saturation values are then compared with the high resolution grayscale value for the boundary pixel. Subsequently, for each boundary pixel on the token, an interpolation factor between foreground and background is stored. However, in this implementation, it is a single number. For rendering, this interpolation factor is selected for the boundary pixel of each token instance, and is used to find the red, green and blue intensities by interpolating between the foreground and background low-resolution color images.

The crucial element is that the boundary pixels of the token are labeled with parameter values that allow an approximate reconstruction of the actual color for each token instance, which has different foreground and background colors. A linear interpolation, as described above, is simple, but other weighted interpolation methods could also be used.

Although the application of the first exemplary embodiment to color images has been presented, one of ordinary skill in the art would readily recognize how the second through fifth embodiments may be implemented to provide color anti-aliased tokens. The basic idea when using tokens is to save just the gray value, or if appropriate, three gray values, and to use this information to determine how similar the rendered boundary pixel is to the foreground and background pixels in that vicinity.

When using the full image mask instead of tokens, the first exemplary embodiment can be implemented in two different ways. The straightforward method is to save and use the color boundary pixels directly. However, if only the grayscale value is available, the grayscale data can be used to interpolate between foreground and background, as described above for tokens. When implementing the second through fifth embodiments in conjunction with the full image mask, interpolation must be performed using the computed gray value, since the actual color or grayscale values of the high resolution boundary pixels are not available.

The exemplary embodiments of the present invention provide methods and systems for adding anti-aliasing to MRC text or lineart masks. These methods improve the appearance of a resulting MRC image, both on display, at high resolution and under typical viewing conditions which are sub-sampled, and on printed output. Although the experimental result examples shown in some of the Figures indicate potential display output for the various exemplary embodiments, the ability to capture on paper the quality of the visual image as it would appear on a 80 ppi display is limited. For example, a binary 300 ppi printer was used to render the images and the rendering algorithm PostScript™ applied halftone filters to render the gray pixels. Each gray pixel on the display is rendered approximately by a 4×4 halftoned region.

Additionally, although methods of image rendering have been explained above to indicate that compressed data is stored to memory 540 and subsequently decoded and used to render images, it is not essential that the compressed data be stored in memory 540. Rather, it is foreseeable that the compressed data provided by the encoder 530 may be provided directly to the decoder 530 to reduce the amount of data to be transmitted to the decoder, e.g., when the decoder is actually part of an image renderer. Such an application would be beneficial when data space in the connection to the image render is limited.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An image rendering system comprising:
a scanner that scans an image and produces image data and high resolution binary data;
an encoder that is coupled to the scanner and encodes the image data to provide encoded image data including anti-aliased grayscale text or lineart data that includes an identification of boundary pixels and associated pixel values, wherein the encoder separates the boundary pixels into interior boundary pixels and exterior boundary pixels; and
a decoder that is coupled to the encoder and decodes the encoded image data to provide decompressed data including anti-aliased text or lineart data and renders the decompressed data, wherein the decoder stores default global grayscale values including first and second default global grayscale values and sets the interior boundary pixels to the first default global grayscale value and sets the exterior boundary pixels to the second global default grayscale value.

2. An image rendering method comprising:
scanning an image to obtain scanned image data including text or lineart data, wherein scanning the image produces high resolution grayscale data;
generating an anti-aliased grayscale version of the text or lineart data, comprising:
separating the grayscale pixels of the high resolution grayscale data into boundary pixels and non-boundary pixels,
individually deriving values of grayscale boundary pixels using the high resolution grayscale data, and
storing the individually derived values of the grayscale boundary pixels, including compressing the individually derived values of the grayscale boundary pixels as part of a set of grayscale tokens that represent connected components in a foreground image that is part of the scanned image data; and
rendering the image using the individually derived pixel values.

3. The image rendering method of claim 2, wherein storing the individually derived values of the grayscale boundary pixels further comprises:
storing at least one of a token index, location, color, character, font ID, and anti-aliasing information with each token instance.

4. The image rendering method of claim 2, further comprising:
scanning an image to obtain scanned color image data; and
representing a foreground image and a background image of the scanned color image data by low-resolution color data.

5. The image rendering method of claim 4, further comprising:
  storing three colors as three grayscale values for each high resolution color boundary pixel on a token.

6. The image rendering method of claim 5, further comprising:
  determining each grayscale value as a fraction of an intensity between the foreground image and the background image.

7. The image rendering method of claim 2, wherein rendering the image further comprises:
  interpolating between foreground and background images using grayscale values of the boundary pixels.

8. The image rendering method of claim 2, further comprising:
  interpolating between foreground and background pixels on the boundary pixels of each instance of each token using the three grayscale values.

* * * * *